United States Patent Office 3,679,353
Patented July 25, 1972

3,679,353
DIRECT DYE, ALKANOLAMINE OR MORPHOLINE, AND NEUTRAL SALT CONCENTRATE AND MILLING PREPARATION THEREOF
Clemens Streck, Loudonville, N.Y., assignor to GAF Corporation, New York, N.Y.
No Drawing. Filed Oct. 30, 1969, Ser. No. 872,723
Int. Cl. C09b 67/00
U.S. Cl. 8—79          8 Claims

ABSTRACT OF THE DISCLOSURE

A method of preparing liquid dispersions of direct dyes. The method includes the steps of mixing a direct dye and a neutral salt with water and milling the resulting mixture to produce a pourable viscous liquid or paste.

---

This invention relates to dyes, and more particularly, this invention relates to a method of preparing a paste or liquid dispersion of direct dyes.

Dyes are conventionally manufactured and sold in dried powder form. There are, unfortunately, disadvantages associated with this practice. The most obvious and most important of these disadvantages is the fact that the dyes dust and contaminate areas adjacent to that wherein they are being used. These disadvantages can be eliminated by using the dyes in liquid form.

Various problems are encountered when preparing such dyes in liquid form. The mixture must be concentrated since the economies of good business practice require that weak liquids not be transported. Further, the concentrated liquid should be stable under the adverse conditions of storage and it should maintain its fluidity while, at the same time, having a certain degree of viscosity. There have been attempts to produce satisfactory liquid dispersions of direct dyes by the addition of solvents and/or dispersing agents to aqueous solutions or dispersions of the dyestuffs. Rarely are such dispersions or pastes perfectly satisfactory. Since the dye concentrations are, of necessity, high, there is often a tendency for the composition to precipitate or form aggregates. Another disadvantage frequently associated with such methods has been that the dye may dissolve to too great an extent, thereby forming a thin solution. This is undesirable since a viscous but pourable paste or liquid is preferred.

Accordingly, it is a primary object of the present invention to prepare direct dye dispersions free of the aforementioned and other such disadvantages.

It is another object of the present invention to provide a method for preparing direct dye dispersions in either liquid or paste form which are both viscous and pourable.

It is yet another object of the present invention to provide a method of preparing direct dye dispersions in liquid or paste form wherein the dyestuff does not agglomerate or precipitate, nor does it become too fluid.

It is a further object of the present invention, consistent with the foregoing objects, to provide a method of preparing a direct dye dispersion which is concentrated, storage-stable, homogeneous and easily pourable.

In accordance with the present invention, an aqueous slurry is prepared of a direct dyestuff with a salt and the slurry is then milled to prepare the viscous but pourable dispersion. It is preferable to include an oxygenated solvent amine, although this is not necessary. Other additives such as antifoam agents or antimicrobials may also be included. According to this invention, the dye is not in solution but is essentially in a finely dispersed state. A very small amount may be in solution but this is negligible. The product can be colloidal as long as it does not form a matrix or a lattice. This result is highly unexpected since it is unusual that a salt would prevent a formation of this kind.

Direct dyes are an accepted class of dyestuffs and are listed as such in the Color Index to describe anionic dyes having an affinity for cellulosic fibers when applied from an aqueous dye-bath containing an electrolyte. Chemically, the majority of the direct dyes are diazo, triazo and polyazo dyes with a comparatively small amount of them being monoazo, stilbene, oxazine, thiazole and phthalocyanine compounds. While direct dyes are defined as anionic dyes having an affinity for cellulosic fibers, certain of them are extensively used for purposes other than for coloring cellulosic fibers such as cotton and paper. These extensive, and important, uses of direct dyes are in their application to leather, silk, wool, polyamide materials, union materials, bast fibers, metal lakes for use as pigments, biological stains, pH indicators and the like. These dyes are normally difficult to produce in good liquid form. Furthermore, a particular class of direct dyes, the so-called "Stilbene" dyes, are particularly difficult to produce in such a form. It has been found, however, that by the method of the present invention, these dyes, as well as other direct dyes, can be produced in a good liquid or paste form.

The concentration of the direct dye varies according to the solubility of the dye. Ideally the composition should contain the largest amount of dye that will be stable on standing in the liquid form. The amount of dye (in pure form) can be from about 5% to about 50% and preferably about 10% to about 30%, based on the total weight of the formulation.

An approximately neutral salt is included in the composition, according to the present invention. Any approximately neutral alkali metal salt is effective. The term "alkali metal" as used herein is understood to include the ammonium cation. Suitable alkali metal salts are the alkali metal halides, sulfates, phosphates and the like. The preferred salts are sodium sulfate, sodium phosphate, sodium bromide, potassium chloride, potassium sulfate, and sodium chloride. The most preferred salt is sodium chloride, since it is the most economical of the salts. The amount of salt present can vary from about 5% to about 30%, but preferably between about 10% and about 20%, based on the total weight of the formulation. The salt appears to keep the dye in a precipitated state while inhibiting a tendency of the dye to become colloidal or soluble.

A solvent oxygenated alkaline amine may also be employed in the formulation. Included in this class of amines are monoethanolamine, diethanolamine, triethanolamine, aminopropanols such as 3-aminopropanol and 2-aminopropanol, aminobutanols such as 4-aminobutanol and 2-aminobutanol, morpholine and the like. The amount of amine can vary from about 20% to about 0.5% based on the total weight of the formulation. A mixture of amines may also be used.

Other additives may be included such as antifoam agents and antimicrobials in effective amounts. The balance of the composition is water.

The ingredients of the composition are mixed with ordinary stirring until uniform. The mixture is then milled with any suitable equipment such as a 2-roll or 3-roll mill, a ball-mill or a mill which produces high shear by use of vibration or other energy sources. The composition is milled until it becomes viscous but pourable in the form of a liquid or paste. Usually viscosity is dependent on the length of time and actual conditions of the milling, such considerations being well-known in the art.

In the case of Stilbene Yellows, ammonia, sodium hydroxide, or potassium hydroxide could be added. Additionally, trimethylolethane and trimethylolpropane could also be used as additives.

The invention will be better understood by reference to the following examples which are to be considered as illustrative and in no manner limiting of the present invention.

EXAMPLE 1

The following formulation was prepared:

| | Parts |
|---|---|
| Stilbene Yellow TP (pure dye) (C.I. 40000, C.I. Direct Yellow 11) | 29.0 |
| Sodium chloride | 15.0 |
| Monoethanolamine | 5.0 |
| DC Antifoam H-10 emulsion (Dow-Corning) | 00.75 |
| Water to 100 parts. | |

The mass was stirred to uniformity and then milled in a Manton and Gaulin mill. The first pass at 5000 p.s.i. resulted in a liquid paste that was not smooth but was thin and pourable. A second pass at 5000 p.s.i. resulted in a more viscous, but readily pourable liquid which is stable on storage. In the case of this dye, to obtain a stable pourable liquid of this nature is unexpected as this dyestuff in particular tends to become colloidal and is difficult to obtain in a stable liquid condition. Normally it readily forms a non-pourable mass.

EXAMPLE 2

The composition of Example 1 was milled in a Vibro Energy mill for 1½ hours. A fluid paste was produced which appeared to have somewhat more fluidity than the fluid of Example 1.

EXAMPLE 3

The composition of Example 1 was milled in a ball mill to the production of a viscous but pourable liquid.

EXAMPLES 4-34

The following dyestuffs were milled in a manner similar to that of Example 1, producing in all cases a viscous, but pourable, and stable liquid.

| | Dye | |
|---|---|---|
| Example | C.I. name | C.I. No. |
| 4 | Direct Yellow 6 | 40001/6 |
| 5 | do | 40001 |
| 6 | Direct Yellow 4 | 24890 |
| 7 | Direct Yellow 5 | 47035 |
| 8 | Direct Yellow 9 | 19540 |
| 9 | Direct Yellow 12 | 24895 |
| 10 | Direct Yellow 27 | 13950 |
| 11 | Direct Yellow 44 | 29000 |
| 12 | Direct Orange 15 | 40002/3 |
| 13 | Direct Yellow 105 | |
| 14 | Direct Orange 26 | 29150 |
| 15 | Direct Orange 8 | 22130 |
| 16 | Direct Orange 73 | 25200 |
| 17 | Direct Red 1 | 22310 |
| 18 | Direct Red 20 | 15075 |
| 19 | Direct Red 23 | 29160 |
| 20 | Direct Red 31 | 29100 |
| 21 | Direct Red 39 | 23630 |
| 22 | Direct Red 83 | 29225 |
| 23 | Direct Violet 47 | 25410 |
| 24 | Direct Blue 1 | 24410 |
| 25 | Direct Blue 6 | 22610 |
| 26 | Direct Blue 8 | 24140 |
| 27 | Direct Blue 15 | 24400 |
| 28 | Direct Blue 71 | 34140 |
| 29 | Direct Blue 86 | 74180 |
| 30 | Direct Green 1 | 30280 |
| 31 | Direct Green 6 | 30295 |
| 32 | Direct Brown 6 | 30140 |
| 33 | Direct Black 38 | 30235 |
| 34 | do | 30235 |

EXAMPLE 35

The following formulation was prepared:

| | Parts |
|---|---|
| Direct violet 9, C.I. 27885 | 29.0 |
| Sodium chloride | 15.0 |
| DC Antifoam H-10 emulsion | 00.75 |
| Water to 100 parts. | |

This composition was milled as in Example 1 producing a viscous, but pourable paste.

EXAMPLE 36

As in Example 35, 29 parts Fastusol Blue LRRU (C.I. Direct Blue 80) was milled with 15 parts sodium chloride, 00.75 part DC Antifoam A and water to 100 parts. A viscous, but pourable paste resulted.

What is claimed is:

1. A method of preparing liquid dispersions of direct dyes that are suitable for storage and use consisting essentially of
   (a) mixing a water-soluble direct dye, a lower molecular weight alkanolamine or morpholine and a neutral alkali metal salt in water to form a uniform formulation mixture, said direct dye being employed in an amount of from about 10% to about 30% by weight, said neutral salt being employed in an amount of from about 10% to about 20% by weight, said alkanolamine or morpholine being present in about 20–0.5% by weight, being based on the total weight of the formulation; and
   (b) milling said formulation mixture under high shear conditions until said mixture becomes viscous while remaining pourable, said dye being essentially in a finely dispersed state rather than in solution, whereby the resulting concentrated, pourable liquid dispersion is homogeneous, viscous and stable, the dye not tending to agglomerate or precipitate during storage.

2. The method of claim 1, wherein said amine is selected from the group consisting of $(HOC_2H_4)_nNR_{3-n}$ wherein R is hydrogen and $n$ is an integer from 1 to 3, 3-aminopropanol, 2-aminopropanol, 4-aminobutanol, 2-aminobutanol, morpholine, and mixtures thereof.

3. The method of claim 2, wherein said amine is monoethanolamine.

4. The method of claim 1, wherein said salt is selected from the group consisting of alkali metal halides, sulfates, phosphates, and mixtures thereof.

5. The method of claim 4, wherein said salt is sodium chloride.

6. The method of claim 1, wherein said mixture further includes in an effective amount, a member of the group consisting of anti-foam agents, anti-microbials, and mixtures thereof.

7. The method of claim 1, wherein said milling is performed on a roll mill.

8. The composition produced by the method of claim 1, free from colloidal lattices or matrices and in liquid, viscous, pourable form.

References Cited

UNITED STATES PATENTS

| 982,194 | 1/1911 | Whitty | 8—79 |
| 1,687,751 | 10/1928 | David | 8—79 |
| 1,923,243 | 8/1933 | Ulrich | 8—88 |
| 2,074,380 | 3/1937 | Flett | 8—79 |
| 2,574,597 | 11/1951 | Salvin | 8—79 |
| 2,768,054 | 10/1956 | Armento | 8—79 |

FOREIGN PATENTS

| 307,948 | 3/1929 | Great Britain | 8—88 |

OTHER REFERENCES

Vickerstoff: Physical Chemistry of Dyeing, p. 18.
Fierz-David et al.: Fundamental Processes of Dye Chemistry, pp. 377–378, pub. by Interscience Publ. Inc.

DONALD LEVY, Primary Examiner

U.S. Cl. X.R.

8—85, 542, 42 R; 260—208